3,329,722
PRODUCTION OF 3-HYDROXY-2,2,4,4-TETRA-
ALKYL-CYCLOBUTANONES
Paul N. Rylander, Newark, N.J., assignor to Englehard
Industries, Inc., Newark, N.J., a corporation of Delaware
No Drawing. Filed Jan. 10, 1964, Ser. No. 336,871
4 Claims. (Cl. 260—586)

This invention relates to the production of 3-hydroxy-2,2,4,4-tetraalkyl-cyclobutanones and more especially to a new and improved process for the production of such ketols.

The catalytic hydrogenation of macrocyclic diketones having 14 to 18 carbons forming the ring nucleus to the corresponding macrocyclic hydroxyketones in the presence of platinum as catalyst is known in the art. Thus 1,9-cyclohexadecanedione has been hydrogenated heretofore to 9-hydroxy-cyclohexadecanone with platinum as catalyst. The use of palladium as catalyst for the partial reduction of such macrocyclic diketones is also known. However, the use of platinum and palladium as catalyst for the hydrogenation of a symmetrical cyclobutanedione such as 2,2,4,4-tetramethyl-1,3-cyclobutanedione, to the corresponding hydroxyketone or ketol has been found to be entirely unsatisfactory for the reason virtually no hydrogenation occurred. And such was the situation even though a diluent such as methanol, dimethyl formamide, ethylacetate, hexane, water and benzene was separately utilized for such cyclobutanedione during the hydrogenation, and utilizing the platinum or palladium as catalyst.

The use of ruthenium to catalyze the hydrogenation of 2,2,4,4-tetramethyl-cyclobutane-1,3-dione under substantially neutral conditions to either the corresponding -1,3-diol or a mixture of the diol and corresponding ketol, 3-hydroxy-2,2,4,4-tetramethylcyclobutanone, in the purification of pivalolactone is also known. However, the latter product mixture is the ketol contaminated with a considerable amount of the diol as well as a high boiling unknown component. The separation of the ketol from the diol tends to be troublesome and is time-consuming.

I have found that the use of rhodium as catalyst for the hydrogenation of 2,2,4,4-tetramethyl-cyclobutane-1,3-dione under neutral or substantially neutral and basic conditions has resulted in respectively the reaction of two moles of hydrogen with the dione to form the corresponding diol and no reaction. Thus when employing water as diluent for the dione for hydrogenation under substantially neutral conditions, the corresponding diol was formed by reaction of two moles of hydrogen with the dione. When a basic diluent such as aqueous sodium hydroxide solution was employed, no hydrogenation of the dione occurred.

The 3-hydroxy-2,2,4,4-tetraalkylcyclobutanones have utility as monomers for the production of polymers useful as plasticizers, plastics, fibers and films. Due to their difunctionality by reason of the hydroxyl and carbonyl groups, such ketols will react with diamines, for instance ethylene diamine, through reductive alkylation and with diacids, for instance succinic and adipic acids, through ester formation to give polymers of the utility specified. Further, esters of the 3-hydroxy-2,2,4,4-tetraalkylcyclobutanones, e.g. the stearate ester of such ketols, exhibit high thermal stability and the desired temperature-viscosity characteristics making them useful as lubricants and hydraulic fluids.

It is an object of this invention to provide a new and improved process for the production of 3-hydroxy-2,2,4,4-tetraalkylcyclobutanones.

Another object is to provide a process for the production of a 3-hydroxy-2,2,4,4-tetraalkylcyclobutanone without the formation of substantial quantities of reaction by-products and free of the corresponding diol, i.e. the 2,2,4,4-tetraalkylcyclobutane-1,3-diol.

Additional objects and advantages will be readily apparent as the invention is hereinafter described in more detail.

In accordance with the present invention, it has now been found that 3-hydroxy-2,2,4,4-tetraalkylcyclobutanones free or substantially free of reaction by-product contaminants including the 2,2,4,4-tetraalkylcyclobutane-1,3-diols and in high yield are obtained by a procedure involving hydrogenating the 2,2,4,4-tetraalkyl-1,3-cyclobutanedione in essentially an acid reaction medium, preferably having a pH of 1–2, in the presence of rhodium as catalyst, and continuing the hydrogenating until the 3-hydroxy-2,2,4,4-tetraalkylcyclobutanone is formed. The thus-formed ketol is then recovered or separated from the reaction mixture. By reason of the acid reaction medium, a spontaneous cessation of the hydrogenation reaction occurs after one mole of the hydrogen has reacted to reduce one keto group to form the ketol, and such cessation of the reaction was entirely unexpected and surprising. The product 3-hydroxy-2,2,4,4-tetraalkylcyclobutanones of this invention was obtained in yields of 95% or higher.

The acid employed in providing the acid reaction medium is one inert or substantially inert to the 2,2,4,4-tetraalkylcyclobutane-1,3-dione being hydrogenated under the conditions of the hydrogenation. Exemplary of such acids are mineral or inorganic acids such as, for instance, HCl, HBr and $H_3PO_4$. The acid is usually admixed with the dione to be hydrogenated as a dilute aqueous solution, of typical concentration of about 0.1 N–0.2 N acid solution. By "acid reaction medium" used herein is meant a liquid mixture of the inert or substantially inert acid as aforesaid usually as a dilute aqueous acid solution and the 2,2,4,4-tetraalkyl-1,3-cyclobutanedione, which mixture of acid and such dione has a pH, prior to the hydrogenation, not above pH 3. The preferred pH of the acid reaction medium is within the range of pH 1–2 as previously disclosed herein.

The 2,2,4,4-tetraalkyl-1,3-cyclobutanediones which are hydrogenated in accordance with this invention are represented by the following general formula:

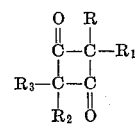

wherein R, $R_1$, $R_2$ and $R_3$ are each an alkyl radical which may be the same or different, for instance lower alkyl radicals, i.e. alkyl radicals containing from 1 to 8 carbon atoms. Exemplary of such cyclobutanediones are 2,2,4,4-tetramethyl-1,3-cyclobutanedione, 2,4 - dimethyl-2,4-diethyl-1,3-cyclobutanedione, 2,2,4,4 - tetraethyl-1,3-cyclobutanedione, 2,2,4,4-tetrapropyl-1,3 - cyclobutanedione, 2,4 - dimethyl-2,4-dipropyl-1,3-cyclobutanedione, 2,2,4,4-tetraoctyl-1,3-cyclobutanedione, 2,2,4,4 - tetrabutyl-1,3-cyclobutanedione, 2,2,4,4-tetraamyl - 1,3-cyclobutanedione, 2,2,4,4-tetrahexyl-1,3,-cyclobutanedione and 2,2,4,4-tetraheptyl-1,3-cyclobutanedione.

The hydrogenation is effected by mixing together the 2,2,4,4-tetraalkyl-1,3-cyclobutanedione and acid diluent, and then treating the liquid acid reaction medium or mixture in the presence of rhodium catalyst with molecular hydrogen. The hydrogen treatment is effected in one embodiment by charging to the reactor containing the liquid acid reaction mixture and catalyst an excess of $H_2$ gas over the amount stoichiometrically required for reaction with the 2,2,4,4-tetraalkyl-1,3-cyclobutanedione to form the 3-hydroxy-2,2,4,4-tetraalkylcyclobutanone, followed by agitating the liquid reaction mixture in the presence of the hydrogen, for instance by shaking or rocking the closed reaction vessel containing the reaction mixture, catalyst and hydrogen by means of a mechanical shaker or rocker. The reaction is carried out until cessation of the reaction occurs, which reaction cessation is indicative of the reaction of one mole of the $H_2$ with the dione to form the corresponding ketol. The cessation of the hydrogenation reaction is indicated by no volume change occurring of the hydrogen-containing gas in the reactor as shown by the level of the liquid in the gas measuring burette rising to a certain level and then stopping and remaining at this level.

The hydrogenation proceeds in accordance with the following equation:

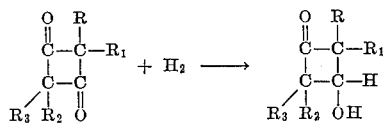

wherein R, $R_1$ $R_2$ and $R_3$ are of the significance aforesaid.

The product 3-hydroxy-2,2,4,4-tetraalkylcyclobutanone is recovered from the reaction mixture in a preferred recovery procedure by separating the catalyst therefrom, for instance by filtration, then separating the acid diluent therefrom, for instance by distillation, and obtaining a pure product ketol by distillation or recrystallization.

The rhodium catalyst is preferably a supported catalyst with the rhodium, i.e. metallic rhodium and/or an oxide of rhodium, deposited on a solid catalyst support such as, for instance, carbon, alumina, barium sulfate or asbestos. The rhodium metal concentration may be from about 0.05%–20% by weight, preferably about 2%–10% by weight (based on rhodium metal plus carrier). The catalyst concentration in the liquid reaction medium may range from about 0.01%–25% by weight, preferably from about 2%–10% by weight (based on the 2,2,4,4-tetraalkyl-1,3-cyclobutanedione). The catalyst support may be in the form of powder, granules, pellets or extruded shapes.

The rhodium catalysts of this invention can be prepared by the precipitation of rhodium on the support in the form of a compound such as rhodium oxide, e.g. by addition of sodium carbonate or sodium hydroxide to an aqueous solution of a rhodium salt, e.g. rhodium chloride. The resulting supported product may then be produced by treatment with a reducing gas, e.g. hydrogen.

The hydrogenation is carried out at a preferred temperature and pressure range of respectively from room temperature to about 100° C. and from about atmospheric pressure to 3,000 p.s.i.g. Less preferably, temperatures up to 150° C. and even higher and temperatures below room temperature could be utilized, if desired. Pressures as high as 5,000 p.s.i.g. and even higher can be employed although less preferred. Typical reaction times are about 5–100 minutes.

The following table sets forth test data results obtained by employing different combinations of the catalyst and diluent for the hydrogenation of 2,2,4,4-tetramethyl-1,3-cyclobutanedione. The hydrogenations were performed as follows, parts and percentages being by weight unless otherwise stated. One-hundred (100) parts by volume of the acid, basic or neutral or substantially neutral diluent specified, 2.50 parts of 2,2,4,4-tetramethyl-1,3-cyclobutanedione, and 300 parts of the catalyst were charged to a reaction vessel which was attached to a vacuum system, a source of hydrogen, and a gas measuring burette. HCl diluent was added as an aqueous solution of concentration of 0.2 N HCl, and the NaOH was added as an aqueous solution of similar concentration of NaOH. With the acid, a pH of 1 was provided in the reaction mixture or medium, while a pH of 13 was provided in the reaction mixture with the NaOH solution. With the methanol, dimethyl formamide, $H_2O$, ethyl acetate, hexane and benzene as diluent, a neutral or substantially neutral reaction medium or mixture resulted. The air was then removed from the reaction vessel by applying a vacuum. The flask was then filled with hydrogen, again evacuated by application of a vacuum, and again filled with hydrogen and the procedure repeated until the air had been substantially removed from the system. The reaction vessel was then shaken on a mechanical shaker at room temperature and atmospheric pressure at about 260 cycles per minute for a period of about 90–180 minutes. The hydrogen absorption was measured as a function of time. The table follows.

| Test Run | Catalyst | Diluent | Results |
|---|---|---|---|
| 1 | Rh | Methanol | No Reaction. |
| 2 | Rh | Dimethyl formamide | Do. |
| 3 | Rh | HCl | Reacted with one mole of $H_2$ to produce 3-hydroxy-2,2,4,4-tetramethylcyclobutanone. |
| 4 | Rh | $H_2O$ | Reacted with two moles of $H_2$ to produce corresponding diol. |
| 5 | Rh | Ethyl acetate | No reaction. |
| 6 | Rh | Hexane | Do. |
| 7 | Rh | HCl | Reacted with one mole of $H_2$ to produce β-hydroxy-2,2,4,4-tetramethylcyclobutanone. |
| 8 | Rh | Benzene | No reaction. |
| 9 | Rh | NaOH | Do. |
| 10 | Ru | $H_2O$ | Reacted with two moles of $H_2$ to produce corresponding diol. |
| 11 | Ru | Methanol | No Reaction. |
| 12 | Ru | HCl | Do. |
| 13 | Pt | Acetic acid | Do. |
| 14 | Pt | Methanol | Do. |
| 15 | Pt | $H_2O$ | Do. |
| 16 | Pt | Dimethyl formamide | Do. |
| 17 | Pt | Ethyl acetate | Do. |
| 18 | Pt | Hexane | Do. |
| 19 | Pt | Benzene | Do. |
| 20 | Pd | Acetic acid | Do. |
| 21 | Pd | Methanol | Do. |
| 22 | Pd | $H_2O$ | Do. |
| 23 | Pd | Dimethyl formamide | Do. |
| 24 | Pd | Ethyl acetate | Do. |
| 25 | Pd | Hexane | Do. |
| 26 | Pd | Benzene | Do. |

The data of the foregoing table shows that only the combination of rhodium catalyst and acid diluent resulted in the reaction of one mole of hydrogen with the 2,2,4,4-tetramethyl-1,3-cyclobutanedione to form the 3-hydroxy-2,2,4,4-tetramethylcyclobutanone, which was identified by infrared analysis. The Rh catalyst of the test runs was Rh supported on carbon and containing 5% rhodium, the Ru catalyst was Ru supported on carbon and containing 5% Ru, the Pt catalyst was 5% platinum supported on carbon and the Pd catalyst was 5% palladium supported on carbon.

What is claimed is:
1. A process for the production of 3-hydroxy-2,2,4,4-tetraalkylcyclobutanone which comprises hydrogenating a 2,2,4,4-tetraalkyl-1,3-cyclobutanedione in an aqueous acid reaction medium having a pH below 3 in the presence of a rhodium catalyst under hydrogenation conditions including temperature between room temperature and about 100° C. and atmospheric pressure, to produce the 3-hydroxy-2,2,4,4-tetraalkylcyclobutanone, and recovering the 3-hydroxy-2,2,4,4-tetraalkylcyclobutanone so formed.

2. The process of claim 1 wherein the tetraalkylcyclobutanedione is 2,2,4,4-tetramethyl-1,3-cyclobutanedione.

3. The process of claim 1 wherein the pH of the reaction medium is within the range of pH 1-2.

4. The process of claim 1 wherein the rhodium is on a solid support.

References Cited
UNITED STATES PATENTS 3,000,906   9/1961   Hasek et al. _____ 260—586 X

OTHER REFERENCES

Miller: "The Structure of Some Derivatives of Dimethylketene," pp. 7–8, (1937).

Breitner et al.: "J. Org. Chem." vol. 24, pp. 1855 to 1857, (1959).

LEON ZITVER, *Primary Examiner.*

M. M. JACOB, *Assistant Examiner.*